United States Patent
Miller

(10) Patent No.: US 10,964,001 B2
(45) Date of Patent: Mar. 30, 2021

(54) MULTISPECTRAL IMAGING SYSTEMS AND METHODS

(71) Applicant: Akoya Biosciences, Inc., Menlo Park, CA (US)

(72) Inventor: Peter J. Miller, Cambridge, MA (US)

(73) Assignee: Akoya Biosciences, Inc., Menlo Park, CA (US)

( * ) Notice: Subject to any disclaimer, the term of this patent is extended or adjusted under 35 U.S.C. 154(b) by 0 days.

(21) Appl. No.: 14/149,015

(22) Filed: Jan. 7, 2014

(65) Prior Publication Data
US 2014/0193050 A1    Jul. 10, 2014

Related U.S. Application Data

(60) Provisional application No. 61/751,194, filed on Jan. 10, 2013.

(51) Int. Cl.
*G06T 5/50* (2006.01)
*G01J 3/50* (2006.01)
(Continued)

(52) U.S. Cl.
CPC .............. *G06T 5/50* (2013.01); *G01J 3/2823* (2013.01); *G01J 3/32* (2013.01); *G01J 3/501* (2013.01);
(Continued)

(58) Field of Classification Search
None
See application file for complete search history.

(56) References Cited

U.S. PATENT DOCUMENTS 5,880,473 A    3/1999 Ginestet
6,142,629 A *  11/2000 Adel .................. G01J 3/10
                                                351/206
(Continued)

FOREIGN PATENT DOCUMENTS

| CN | 102327156 | 1/2012 | ............. A61C 19/04 |
| EP | 2 359 745 | 8/2011 | ............. A61B 5/00 |
| WO | WO 2012/149555 | 11/2012 | ............. G01N 21/64 |

OTHER PUBLICATIONS

W.E. Johns. 'Notes on LEDs'. 2004 Retrieved from the Internet: <URL:http://www.gizmology.net/LEDs.htm>.*

(Continued)

*Primary Examiner* — Jiangeng Sun
(74) *Attorney, Agent, or Firm* — Fish & Richardson P.C.

(57) ABSTRACT

The methods and systems disclosed herein include obtaining a first image of a sample, where the first image corresponds to light transmitted through the sample in a first plurality of distinct spectral bands, obtaining a second image of the sample, where the second image corresponds to light transmitted through the sample in a second plurality of distinct spectral bands, and where at least some members of the second plurality of spectral bands are different from the members of the first plurality of spectral bands, and combining the first and second images to form a multispectral image stack, where each pixel in the image stack includes information corresponding to at least four distinct spectral bands, and where the at least four distinct spectral bands include at least one member from the first plurality of spectral bands and at least one member from the second plurality of spectral bands.

21 Claims, 9 Drawing Sheets

(51) Int. Cl.
*G01J 3/28* (2006.01)
*G01J 3/51* (2006.01)
*G01J 3/32* (2006.01)

(52) U.S. Cl.
CPC ......... *G01J 3/51* (2013.01); *G01J 2003/2826* (2013.01); *G06T 2207/20221* (2013.01)

(56) References Cited

U.S. PATENT DOCUMENTS

| | | | |
|---|---|---|---|
| 7,321,791 | B2 | 1/2008 | Levenson et al. |
| 7,953,264 | B2 | 5/2011 | Levenson et al. |
| 8,208,704 | B2 | 6/2012 | Wong et al. |
| 2002/0001080 | A1* | 1/2002 | Miller ................ G01J 1/08 356/326 |
| 2005/0030315 | A1 | 2/2005 | Cohen et al. |
| 2006/0118742 | A1* | 6/2006 | Levenson et al. ......... 250/559.3 |
| 2006/0245631 | A1* | 11/2006 | Levenson ............ G06K 9/6247 382/133 |
| 2007/0016082 | A1* | 1/2007 | Levenson ............ A61B 5/0059 600/476 |
| 2007/0147673 | A1* | 6/2007 | Crandall .............. G02B 21/367 382/128 |
| 2007/0153370 | A1* | 7/2007 | Olszak ..................... G01J 3/02 359/368 |
| 2008/0144169 | A1* | 6/2008 | Zahniser .............. G02B 21/086 359/385 |
| 2008/0194969 | A1* | 8/2008 | Werahera et al. ............. 600/476 |
| 2010/0086220 | A1 | 4/2010 | Minear |
| 2010/0160791 | A1* | 6/2010 | Liu et al. .................... 600/476 |
| 2010/0189321 | A1 | 7/2010 | Otsuka |
| 2011/0117025 | A1* | 5/2011 | Dacosta et al. ................ 424/9.6 |
| 2011/0144462 | A1* | 6/2011 | Lifsitz et al. ................. 600/336 |
| 2011/0292343 | A1* | 12/2011 | Papac ................. A61B 3/0008 351/221 |
| 2012/0085932 | A1 | 4/2012 | Themelis |
| 2012/0128264 | A1* | 5/2012 | Yazdanfar et al. ............ 382/274 |
| 2012/0326055 | A1* | 12/2012 | Wilson et al. ............. 250/459.1 |
| 2013/0012794 | A1* | 1/2013 | Zeng et al. .................... 600/328 |
| 2013/0038725 | A1* | 2/2013 | Lanoue et al. ................ 348/143 |
| 2013/0041267 | A1* | 2/2013 | Ntziachristos et al. ...... 600/476 |
| 2014/0022381 | A1* | 1/2014 | Heinold ........................ 348/135 |
| 2014/0293036 | A1* | 10/2014 | Ddecaux .............. G01N 21/255 348/80 |

OTHER PUBLICATIONS

U.S. Non-Final Office Action for U.S. Appl. No. 14/149,020 dated Mar. 24, 2015 (11 pages).
International Search Report and Written Opinion of International Application No. PCT/US2014/010475 dated Mar. 9, 2014 (13 pages).
International Search Report and the Written Opinion of the International Searching Authority for International Application No. PCT/US2014/010483 dated Jun. 6, 2014.
International Preliminary Report on Patentability for International Application No. PCT/US2014/010483 dated Jul. 23, 2015 (11 pages).
Themelis et al., "Multispectral imaging using multiple-bandpass filters", *Optics Letters*, vol. 33, No. 9, pp. 1023-1025 (May 1, 2008).
Office Action for Chinese Application No. 201480012433.7 dated Jun. 29, 2016.
Non-Final Office Action for U.S. Appl. No. 14/149,020 dated Sep. 29, 2016 (14 pages).
Communication from the European Patent Office for European Application No. 14 703 190.0 dated Dec. 8, 2016 (5 pages).
Chinese Office Action for Chinese Application No. 201480011495.6 dated Jan. 11, 2017 (26 pages).
Chinese Office Action for Chinese Application No. 201480012433.7 dated May 4, 2017.
Varga et al., "Automated High Throughput Whole Slide Imaging Using Area Sensors, Flash Light Illumination and Solid State Light Engine", Perspectives on Digital Pathology: Results of the Cost Action IC0604 Euro-Telepath; In: Studies in Health Technology and Informatics, vol. 179, pp. 187-202 (Aug. 28, 2012).

\* cited by examiner

MULTISPECTRAL IMAGING SYSTEMS AND METHODS

CROSS-REFERENCE TO RELATED APPLICATIONS

This application claims priority to U.S. Provisional Patent Application No. 61/751,194, filed on Jan. 10, 2013, the entire contents of which are incorporated by reference herein.

TECHNICAL FIELD

This disclosure relates to imaging of biological samples, and more particularly to multispectral brightfield imaging of cells and tissue, and analysis of the images.

BACKGROUND

Color images of biological cell and tissue samples are valuable for uses that include diagnosis, communication, archiving, and analysis. One common imaging technique is to produce a so-called brightfield image in which the image is formed by light that is transmitted through the sample, or has been reflected from it. Brightfield imagery is useful for samples prepared with hematoxylin and eosin, Papanicolau stain, immunohistochemical stains such as DAB, and other absorptive or scattering agents. The image in such cases corresponds to an RGB (color) view of the sample, and it can be recorded using a digital color (RGB) camera.

Digital RGB cameras employ a variety of techniques to obtain an image. The most common is to incorporate a color mosaic pattern such as a Bayer pattern into a pixelated sensor, so that individual pixels record the signal content in a specific color, and the signals from adjacent pixels are combined to create an estimate of the color content in a pixel neighborhood. Alternatively, in a 3-chip color camera, a trichroic optical element is used to split incoming light according to its color, and direct light of different colors onto three different imaging sensors, so each sensor receives light of a given primary color. The images from the three sensors are then combined to form an overall color image.

In other RGB cameras, a color filter wheel or electronically tunable filter is employed together with a monochrome sensor, and three or more images are taken while the filter is cycled through the primary colors. The resulting images of individual color planes are combined to form a color image.

By one technique or another, color cameras produce an image with R, G, and B values that correspond to the overall signal in each primary color; or equivalently, the image can be expressed in other color spaces such as L*ab, Luv, YIQ, XYZ, or others.

Whole slide imaging systems have been developed that can produce a digital brightfield image of an entire microscope slide, or portions thereof. They include microscope imaging optics and digital cameras together with mechanical apparatus to sweep out a scan of the sample, along with software to coordinate these actions and store the resulting images. A typical pathology specimen can be imaged in 5 minutes or less, often in 2 minutes or less, and the resulting image may have a resolution of ¼ micron or finer, corresponding to 3.6 billion pixels for a 15×15 mm sample. These systems are used in the fields of research and clinical pathology, to image tissue sections, cytology samples, and other samples for which microscopic imaging is valuable.

One application of whole slide brightfield imaging is for measurement and quantitation of immunohistochemical (IHC) assays. These are antibody-based assays, typically using an enzymatic amplification step, in which a chromogen is bound to sites containing a specific protein, enabling protein expression to be detected and measured.

Multispectral imaging systems exist that can measure more than 3 colors in a brightfield image of a sample. The Vectra imaging system (available from PerkinElmer, Waltham Mass.) is an example of such a system. It uses a liquid crystal tunable filter to select individual wavelengths within the visible range, under computer control, while taking images with a monochrome digital camera. The data thus acquired is termed an image stack or image cube, and contains a spectrum at each of many spatial locations in an image.

SUMMARY

In general, in a first aspect, the disclosure features methods that include obtaining a first image of a sample, where the first image corresponds to light transmitted through the sample in a first plurality of distinct spectral bands, obtaining a second image of the sample, where the second image corresponds to light transmitted through the sample in a second plurality of distinct spectral bands, and where at least some members of the second plurality of spectral bands are different from the members of the first plurality of spectral bands, and using an electronic processor to combine the first and second images to form a multispectral image stack, where each pixel in the image stack includes information corresponding to at least four distinct spectral bands, and where the at least four distinct spectral bands include at least one member from the first plurality of spectral bands and at least one member from the second plurality of spectral bands.

Embodiments of the methods can include any one or more of the following features.

Each pixel in the image stack can include information corresponding to at least five distinct spectral bands. Each pixel in the image stack can include information corresponding to at least six distinct spectral bands.

The first plurality of distinct spectral bands can include a spectral band in a green region of the electromagnetic spectrum having a full width at half maximum of 40 nm or less (e.g., 30 nm or less).

The methods can include using the electronic processor to unmix the image stack to obtain one or more component images, where each of the component images corresponds substantially only to contributions from one of the spectral contributors in the sample. The methods can include using the electronic processor to convert light intensity values corresponding to each of the pixels in the image stack to optical density units prior to unmixing the image stack. The methods can include using the electronic processor to analyze the sample based on the one or more component images to determine locations of features within the sample.

The methods can include using a slide scanner to obtain the first and second images. The first plurality of spectral bands and the second plurality of spectral bands can each include a shared spectral band, the methods can include using the electronic processor to align the first and second images prior to forming the image stack based on information from the first and second images corresponding to the shared spectral band.

Embodiments of the methods can also include any of the other features and/or aspects and/or steps disclosed herein, in any combination, as appropriate.

In another aspect, the disclosure features systems that include a light source configured to illuminate a sample, a detector configured to obtain one or more images of the sample, and an electronic processor coupled to the detector and configured to: obtain a first image of a sample, where the first image corresponds to light transmitted through the sample in a first plurality of distinct spectral bands; obtain a second image of the sample, where the second image corresponds to light transmitted through the sample in a second plurality of distinct spectral bands, and where at least some members of the second plurality of spectral bands are different from the members of the first plurality of spectral bands; and combine the first and second images to form a multispectral image stack, where each pixel in the image stack includes information corresponding to at least four distinct spectral bands, and where the at least four distinct spectral bands include at least one member from the first plurality of spectral bands and at least one member from the second plurality of spectral bands.

Embodiments of the systems can include any one or more of the following features.

Each pixel in the image stack can include information corresponding to at least five distinct spectral bands. Each pixel in the image stack can include information corresponding to at least six distinct spectral bands.

The first plurality of distinct spectral bands can include a spectral band in a green region of the electromagnetic spectrum having a full width at half maximum of 40 nm or less (e.g., 30 nm or less).

The electronic processor can be configured to unmix the image stack to obtain one or more component images, where each of the component images corresponds substantially only to contributions from one of the spectral contributors in the sample. The electronic processor can be configured to convert light intensity values corresponding to each of the pixels in the image stack to optical density units prior to unmixing the image stack. The electronic processor can be configured to analyze the sample based on the one or more component images to determine locations of features within the sample.

The systems can include a slide scanner that features the light source and the detector. The first plurality of spectral bands and the second plurality of spectral bands can each include a shared spectral band, and the electronic processor can be configured to align the first and second images prior to forming the image stack based on information from the first and second images corresponding to the shared spectral band.

Embodiments of the systems can also include any of the other features and/or aspects and/or components disclosed herein, in any combination, as appropriate.

In a further aspect, the disclosure features methods that include: (a) obtaining a first image of a sample using a color camera, where (i) the first image includes a plurality of pixels, each pixel featuring three light intensity signals, (ii) for each pixel, each of the light intensity signals corresponds to illumination light in one or more of three distinct wavelength bands that is incident on the sample, and (iii) one of the wavelength bands corresponds to a green region of the electromagnetic spectrum and has a full width at half maximum of 40 nm or less; and (b) using an electronic processor to (i) transform the first image to generate a corrected image, where the transformation includes, for each one of the pixels, adjusting each of the three light intensity signals to reduce contributions thereto from illumination light in all but one of the three distinct wavelength bands, and (ii) convert the light intensity values in the corrected image to optical density units.

Embodiments of the methods can include any one or more of the following features.

The methods can include using the electronic processor to unmix the corrected image to obtain one or more component images. The methods can include using the electronic processor to analyze the sample based on the one or more component images to determine locations of features within the sample.

Embodiments of the methods can also include any of the other features and/or aspects and/or steps disclosed herein, in any combination, as appropriate.

In another aspect, the disclosure features methods that include: (a) obtaining a first image of a sample using a color camera, where (i) the first image includes a plurality of pixels, each pixel featuring three light intensity signals, (ii) for each pixel, each of the light intensity signals corresponds to light emitted from the sample in one or more of three distinct wavelength bands, and (iii) one of the wavelength bands corresponds to a green region of the electromagnetic spectrum and has a full width at half maximum of 40 nm or less; and (b) using an electronic processor to (i) transform the first image to generate a corrected image, where the transformation includes, for each one of the pixels, adjusting each of the three light intensity signals to reduce contributions thereto from the light emitted from the sample in all but one of the three distinct wavelength bands, and (ii) convert the light intensity values in the corrected image to optical density units.

Embodiments of the methods can include any one or more of the following features.

The methods can include using the electronic processor to unmix the corrected image to obtain one or more component images. The methods can include using the electronic processor to analyze the sample based on the one or more component images to determine locations of features within the sample.

Embodiments of the methods can also include any of the other features and/or aspects and/or steps disclosed herein, in any combination, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Figure 1:
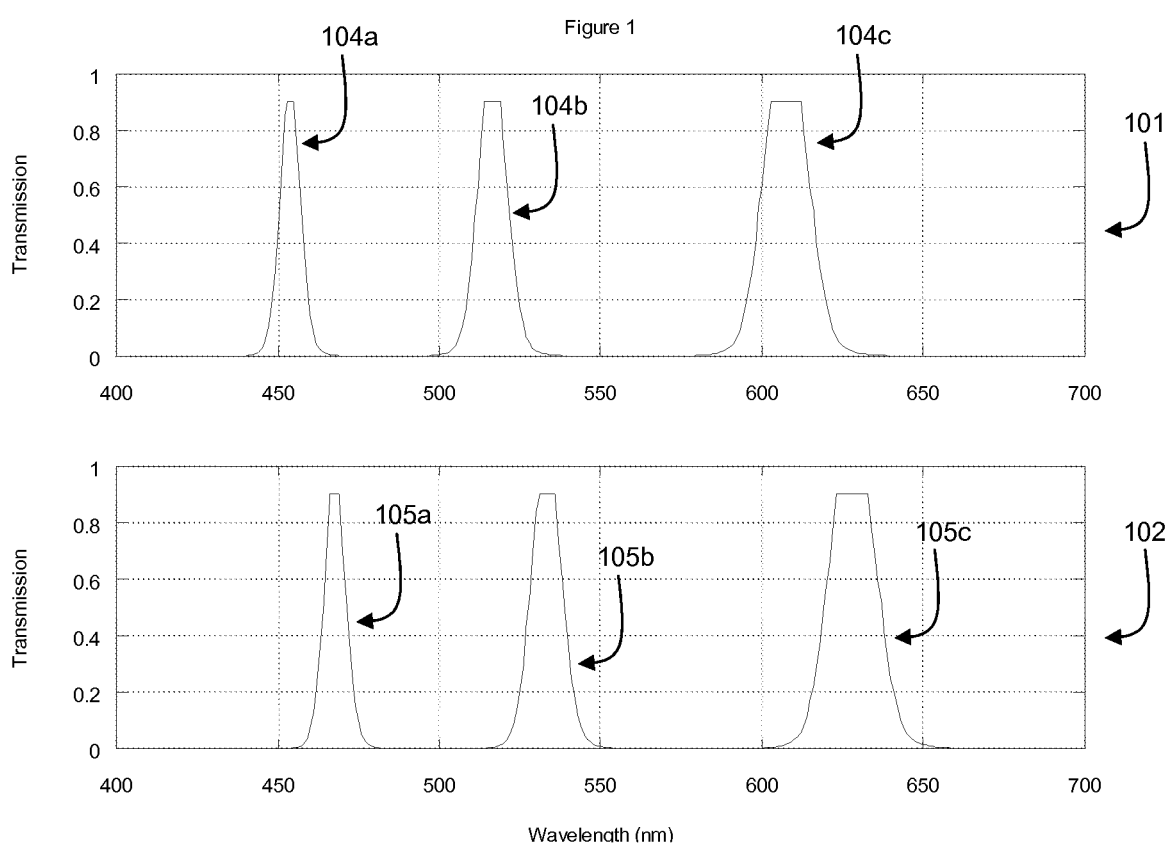
FIG. 1 is graph showing light transmission as a function of wavelength for two spectral filters used to image samples.

Unfortunately, conventional multispectral brightfield imaging systems typically acquire images very slowly, requiring roughly a few seconds per recorded image. At that rate, it takes over an hour to scan a whole slide. This is inconsistent with the workflow and performance that are required in many whole slide imaging applications.

The systems and methods disclosed herein permit rapidly obtaining multispectral brightfield transmitted light images of biological samples, including without limitation tissue sections, samples derived from blood, and cytology samples. The methods and systems permit whole slide multispectral imaging, where each point in the sample is described by a signal spectrum that includes five or more wavelength bands, and there is no spatial misalignment between images corresponding to the different spectral bands. In some cases, the multispectral images may include images corresponding to as many as 9 spectral bands.

The methods and systems disclosed herein also permit whole slide image acquisition and analysis that uses spectral unmixing to improve quantitation of signal levels, or improved classification, or both. Spectral unmixing techniques make it possible to unmix the spectrum at each position of an image stack (e.g., an image cube) into its various component signals, using a spectral library of known spectra for the components that are present in the sample. Nuance software, available from PerkinElmer (Waltham Mass.) can produce such spectral libraries and use them to unmix image cubes into component images. Spectral unmixing is also useful when performing classification or image analysis. Methods and systems for spectral unmixing and for performing classification and/or image analysis based on unmixed images are disclosed, for example, in U.S. Pat. Nos. 7,321,791 and 7,953,264, the entire contents of each of which is incorporated herein by reference.

In certain embodiments, the systems and methods disclosed herein include imaging a location in a sample using a color RGB camera, such as a mosaic camera or 3-chip camera, to acquire images corresponding to 3 spectral bands in a first image, and 3 spectral bands in a second image. The illumination or imaging optics are reconfigured between acquisition of the first and second images, so the first and second images correspond to different spectral bands. The two images are combined to form a multispectral image stack with images corresponding to 4 or more spectral bands.

In some embodiments, first, second, and third images of a sample region are obtained, where each images corresponds to 3 different spectral bands. The illumination or imaging optics are reconfigured for at least 2 of these images, and the set of images is combined to form an overall image (e.g., an image stack) with spectral images that correspond to 5 or more different spectral bands.

In certain embodiments, a first optical filter is introduced into the illumination or imaging path, which transmits light within 3 distinct narrow spectral bands, while the first image is obtained. Then a second optical filter is introduced in place of the first filter. The second filter transmits light within 3 different, distinct narrow spectral bands. The second image is obtained with the second filter in place. If a third image of the sample is obtained, then a third optical filter replaces the second filter while the third image is obtained.

In some embodiments, illumination is performed by a set of LEDs that only provide light within 3 distinct, narrow spectral bands. A different combination of LEDs is active during acquisition of the first image, of the second image, and of the third image (if the third image is acquired). Among the first and second (and optionally, the third) images, images are obtained that correspond to 4 or more distinct spectral bands.

In certain embodiments, the systems and methods disclosed herein are used for whole slide multispectral scanning, where a first scan is taken using a color RGB camera to acquire images corresponding to 3 spectral bands, the illumination or imaging optics are reconfigured, and a second scan is taken to acquire images corresponding to 3 spectral bands. Images of the first and second scans are combined to form a multispectral image stack with images corresponding to 4 or more different spectral bands.

While images corresponding to the 3 spectral bands acquired during the first scan are registered among themselves, and the images corresponding to the 3 spectral bands acquired during the second scan are registered among themselves, images in the first scan may be misaligned with respect to images in the second scan due to mechanical limitations of the scanning apparatus, whereby the scanning stage cannot return to exactly the same locations as were used in the first scan. Thus, individual pixels in each scan may correspond to slightly different locations in the sample, so that images of the two scans are not perfectly registered.

However, images in the two scans can be registered to each other using an image in each scan that corresponds to a shared band (e.g., a spectral band that is common to both scans). The shared spectral band can be the same spectral band in both scans. Alternatively, the shared spectral band can be similar enough in both scans that the same structures are present in the images that correspond to the shared spectral band, so that the images can be co-registered with one another. By aligning the images of the second scan to the images of the first scan, or vice versa, a combined multispectral image stack is obtained with 4 or more images corresponding to distinct spectral bands, all of which are perfectly registered together. Having spatially registered images in a multispectral image stack is important in a variety of imaging applications. For example, if the layers of the image stack are spatially well-registered, spectral unmixing methods can be used without calculation errors arising from misalignment.

In some embodiments, two images or scans are obtained of the sample, and some of the individual spectral bands to which the images correspond cover a relatively narrow spectral range, having a full-width at half-maximum of 40 nm or less, 30 nm or less, or even 20 nm or less. Thus, the resulting images can include 4 or more spectral bands, e.g., 6 spectral bands, or the resulting scans can include 4 or more spectral images, e.g., 6 spectral images, each of which corresponds to a different, relatively narrow spectral band. In certain embodiments, three scans of the sample are obtained, and the combined multispectral image stack includes up to 9 images, each of which corresponds to a different spectral band.

Using larger numbers of images, each corresponding to a different spectral band, can be beneficial when analyzing the images via spectral unmixing, because it enables more accurate measurements than when fewer bands are provided and/or when the spectral bands cover a broad range of wavelengths such as 40 nm or more. This is because unmixing typically uses an optical density conversion whereby logarithms are taken of intensity (or transmission) values to enable linear unmixing of the various stain components in the sample. But the contribution to optical density for a given sample component (e.g., stain) is only linear with concentration if the absorption of each stain is uniform across each band, which may not be true if images corresponding to broad spectral bands are used, as in RGB color imaging. When the relationship is not linear, spectral unmixing can yield inaccurate results. The systems and methods disclosed herein overcome these limitations by obtaining images that correspond to narrow spectral bands.

Embodiments of the systems and methods disclosed herein can provide a number of advantages. For example, compared to RGB color imaging, the methods and systems provide enhanced accuracy for spectral analysis such as spectral unmixing because of the greater number, narrowness, and/or cross-talk isolation of the spectral bands to which the images correspond.

As another example, compared to multispectral imaging systems with a monochrome sensor and a tunable filter, the systems and methods disclosed herein perform multispectral imaging by obtaining fewer images (by a factor of 3), and by performing fewer filter configuration steps (by a factor of 3).

For example, compared to whole slide scanning systems in which the optical configuration is cycled through multiple settings at each location in the sample, there is an enormous reduction in mechanical motion and overall time. A typical sample may require 1,000 individual fields to be imaged, so acquiring a 6-band multispectral image using a tunable filter and a monochrome imaging sensor involves changing the filter 6,000 times and taking 6,000 separate images. Even if a high-speed mechanism is used that can change filters in 200 milliseconds, 20 minutes are spent just for the filter cycling, in addition to the time needed for exposure, camera readout, focusing, image storage, etc.

In contrast, the systems and methods disclosed herein reconfigure the optical filters just once during sample imaging, which typically takes under 1 second. The overall scan time is simply twice the time for obtaining a single scan, which is usually under 5 minutes, and often under 2 minutes. Thus, the methods and systems disclosed herein obtain a multispectral image stack for the sample in 4-10 minutes or less, yielding improvement in terms of scan speed and in terms of fewer mechanical operations (thus improving lifetime and reliability).

In some embodiments, the three bands to which the images in a scan correspond are related to the signals contained within in the blue, green, and red channels of a color RGB camera. In certain embodiments, a conventional color image is rendered from images corresponding to 4 or more distinct spectral bands. Especially when images corresponding to 5 or more spectral bands are present, or even more, this color image can have improved color accuracy compared with the output of the RGB digital camera signal.

In some embodiments, the shared band is in the red or green region of the visual portion of the electromagnetic spectrum. Common stains such as hematoxylin are absorptive in these regions.

In certain embodiments, in addition to registering the images of different scans, the image(s) corresponding to the shared spectral band can also be used to choose a focus setting in the different scans. Alternatively, or in addition, the focus height settings from the first scan can be re-used in subsequent scans, so the same structures are brought into focus in each scan. In some embodiments, images corresponding to different spectral bands within each scan have good pixel registration amongst themselves. The images in the two (or more) different scans are then aligned using information derived from the images in each scan that correspond to the shared spectral band.

In some embodiments, the multispectral image stack is converted to optical density units, and then unmixed into component images. Conversion to optical density units provides improved numerical accuracy in quantitative results, because contributions from multiple components in the sample to measured spectral images are properly linearly combined in optical density units. In certain embodiments, the resulting multispectral image stack (e.g., image cube) is unmixed into component images, and then image analysis is performed on the unmixed component images.

The following example illustrates an embodiment of the invention. A Hamamatsu C7780-10 Orca-3CCD camera was attached to an Olympus BX53 microscope, equipped with a 20× ULSAPO objective and tungsten-halogen lamp. A filter with transmission shown as 101 in FIG. 1 (with principal spectral bands 104a, 104b, and 104c) was placed in the UTAD filter holder that can be fitted into the nosepiece of the microscope. A second filter with transmission as shown as 102 in FIG. 1 (with principal spectral bands 105a, 105b, and 105c) was placed in another UTAD filter holder. A sample, which was a 4 micron thick section of a breast biopsy block, was prepared using a dual-IHC staining protocol, using diaminobenzadine (DAB) to visualize Her2, and Liquid Permanent Red (available from Dako Denmark, Glostrup, Denmark) to visualize Ki-67, with a hematoxylin nuclear counterstain. Techniques for this preparation are known in the art of histology and a helpful guide to IHC sample preparation is provided in "Multiple Immunoenzyme Staining: Methods and Visualizations for the Observation with Spectral Imaging", *J. Histochem Cytochem.* 56(4): 313-328 (2008), the entire contents of which are incorporated by reference herein.

In some embodiments, a white reference is obtained by taking one or more images of a clear microscope slide on which there is no sample, or by taking one or more images of a clear region of a sample in which there is no tissue material present. Referring to FIG. 1, a first filter having a spectral response 101 is then placed into the microscope, and an image is obtained. The first filter is then replaced with the second filter having a spectral response 102, and a second image is acquired. For both of these images, the camera's gamma value is set to 1, and the white-point correction is disabled or set to manual.

If possible, the raw signals from the sensors within the camera are recorded. In many RGB cameras, the raw signal levels from the individual sensors or pixels are processed to produce the RGB image that the camera provides. Typically, this processing involves multiplying the red, green, and blue signal levels from the sensor(s) by a color correction matrix (CCM) to obtain the output image color values. It can be advantageous to disable this processing, and to obtain the raw signal levels from the individual sensors or pixels when possible. For example, the command set for a given digital camera may provide a way to request the raw signal levels. Alternatively, it may be possible to specify the CCM, in which case the camera's color correction can be effectively disabled by setting the CCM to the 3×3 identity matrix.

If it is not possible to obtain the raw signals from the camera, the CCM will add cross-talk between the color channels. Crosstalk can be compensated by techniques described below, but it is generally preferable to eliminate sources of crosstalk rather than to correct for their effects afterwards.

The images taken with filter 101 and with filter 102 are then combined into an image stack (e.g., image cube). Combining images can include storing the images in a single computer file, placing the images adjacent to one another in memory within a computer, and/or storing the images in separate computer files that are known to be associated with one another. More generally, the images can be combined using a variety of methods, provided that they are logically grouped together and form a white reference for the overall image acquisition.

It can be advantageous to acquire several images, at various locations on the slide, and use these to produce a white reference that is unaffected by dust or particles that may be present on the slide. Considering the population of all readings for a given color channel and filter (101 or 102), the median value can be adopted as the white reference, which is thereby unlikely to correspond to a measurement of dust. For example, if three images are taken, having intensity values at a given pixel of 153, 117, and 159, respectively, for the blue channel when filter 101 is used, the value of 153 can be used as the white reference at that pixel location for this channel and filter combination.

During imaging of the sample, the gain, exposure time, and lamp brightness are generally adjusted to yield a strong signal that is free of saturation. Some cameras provide separate adjustment of these parameters for each color plane, and if so, it may be possible to balance the signals in the red, green, and blue channels. Alternatively, one can incorporate a color-balancing filter in the illumination optics that produces approximately equal signals in all bands. Typically, the blue channel of the sensor will have the least signal, largely because the halogen lamp spectrum usually contains more green and red signal than it does blue.

If the camera readings differ significantly from zero when no light is present, it can be beneficial to record a dark reference. The signal obtained in that situation is sometimes termed a dark signal, and the dark reference can be a single number that indicates the average dark signal across all pixels in the image, or it can be an image that indicates the dark signal on a pixel-by-pixel basis. The dark reference can be obtained by shuttering the illumination light or otherwise preventing the light from reaching the camera, and taking images of a nominally dark scene. The full images may be retained if the dark reference is to be a pixel-by-pixel reference. Alternatively, all pixels in a given image plane may be averaged to produce a vector of values representing the dark signal in each of the raw blue, green, and red channels. If the vector elements corresponding to the blue, green, and red channels are sufficiently similar, a single value may be used for all pixels of all channels.

Figure 3:
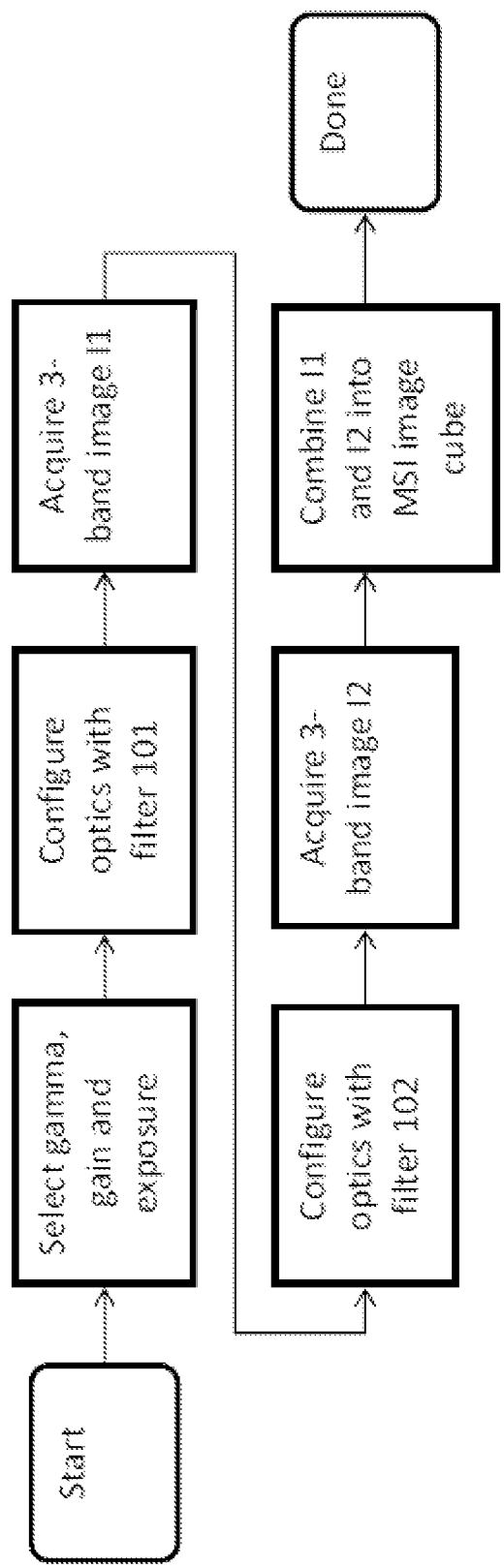
FIG. 3 is a flow chart that includes a series of steps for acquiring sample images and combining them to form a multispectral image stack.

The sample is then imaged as follows: filter 101 is positioned in the nosepiece of the imaging system, and then the objective position is adjusted to bring the sample into focus on the detector. The system acquires an image of the sample using the same camera settings and exposures as were used with this filter when taking the white reference. Then filter 101 is removed, filter 102 is positioned to filter the illumination light, and a second image of the sample is obtained using the same camera settings and exposures as were used with this filter when acquiring the white reference. The two sample images are then combined to form an image stack for the sample. The steps disclosed above are shown schematically in the flow chart of FIG. 3.

Preferably, the image stack is pre-processed as follows. First, the sample image stack is corrected for its dark signal, if a dark reference exists, by subtracting the dark signal from each plane (e.g., image) within the stack. Then, the image stack is converted to scaled transmission values. This is commonly done by dividing the signal at a given pixel by the white reference signal at that pixel, after the white reference signal has itself been corrected for its dark signal, and then multiplying the result by a predefined full-scale value. Converting the image stack to scaled transmission values occurs according to:

$$T_{x,y,b} = FS \frac{S_{x,y,b} - Dark_{x,y,b}}{White_{x,y,b} - Dark_{x,y,b}} \quad [1]$$

where: b denotes a band (which means a particular color band and filter combination); x and y denote pixel locations in the image stack; T, S, and White are image cubes representing the scaled transmission image stack, the measured camera signals, and the white reference; Dark is an image cube, a vector, or a scalar value that represents the dark reference; and FS is the full-scale value.

In some embodiments, T is represented as a single data byte, in which case FS is typically chosen to be in the range 230-250, to balance the concerns of information loss through quantization on one hand, and saturation on the other. Alternatively, T can be represented as a floating point value, in which case FS may be unity, or T can be a 16-bit integer, in which case larger values of FS are practical. Still further, FS can be represented as some other data object, according to the task at hand and factors such as image size, and available memory for storing image data. While T represents an image of the sample in transmission space, it is also perfectly valid to think of it as being a brightness measurement, where a clear sample with no absorption has brightness of FS in all channels, and an opaque sample has brightness of zero.

The resulting image stack T contains measurements (e.g., images) of the sample in six spectral bands, corresponding to the product of the principal bands 104a, 105a, 104b, 105b, 104c, and 105c with the camera response. Consequently, it is a rich data set for spectral analysis and image analysis, as will be discussed below.

Figure 7:
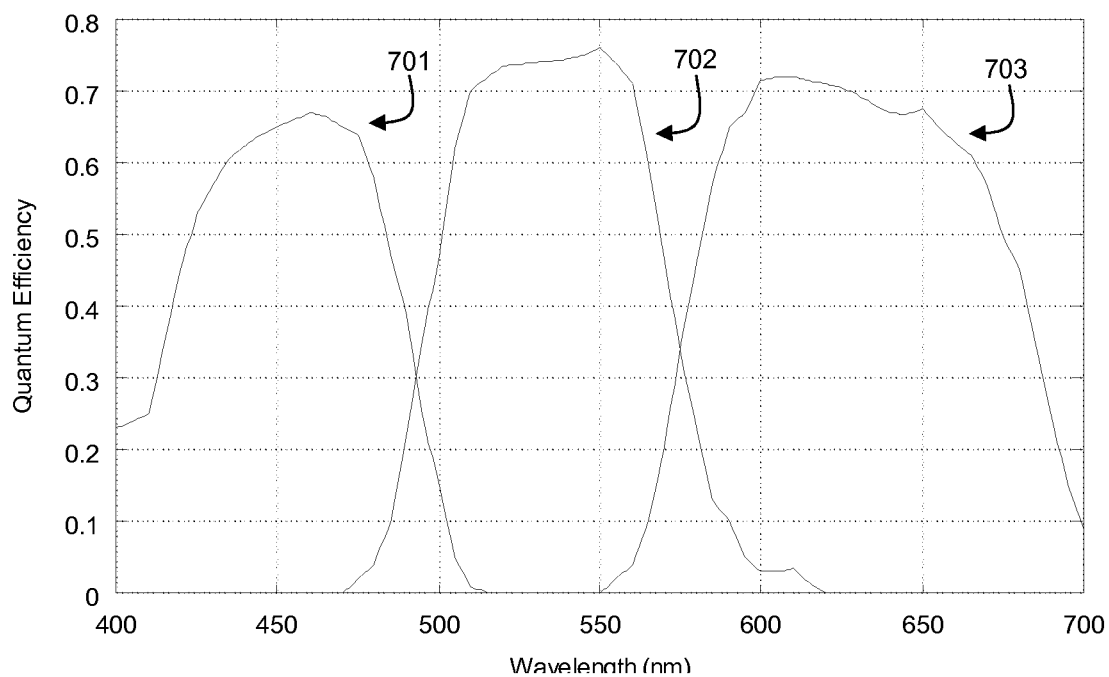
FIG. 7 is a graph showing the spectral response of RGB channels for a color camera.

In this example, the individual color channels in the RGB camera have responses as shown in FIG. 7, where the blue channel response is labeled 701, the green channel response is labeled 702, and the red channel response is labeled 703. These are relatively well isolated, and they only overlap in the transition regions near 490 nm and 580 nm. Put another way, the red channel of the camera has little or no response for wavelengths in the range below 550 nm, where the green and blue channels have their primary response; the green channel has little response outside of the range below 490 nm or above 580 nm, where the blue and red channels have their primary response; and the blue channel has little response above 500 nm, where the green and red channels have their primary response. This means that the signal levels in the red image S, obtained with filter 101 present, correspond almost entirely to the signal in band 104*c*, and so on. This isolation between color channels simplifies the data processing and reduces noise.

However, not all cameras have this degree of isolation, and cross-talk between color channels of the camera is often higher for cameras that use a color mosaic pattern. To the extent that cross-talk between channels exists, it is preferable to reduce or eliminate it.

Figure 8:
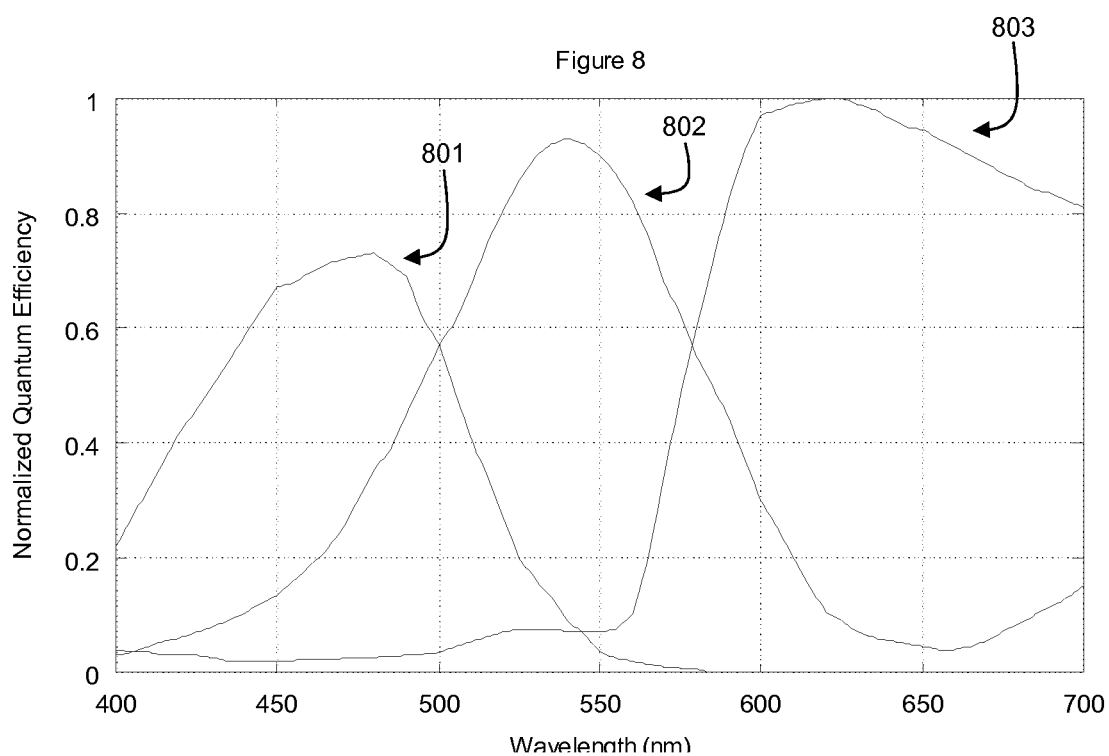
FIG. 8 is a graph showing the spectral response of RBG channels in a Sony Bayer-pattern RGB camera.

In some embodiments, different imaging components are used. For example, the Hamamatsu Orca camera described above can be replaced with a Lumenera LW-1160 color camera based on the Sony ICX-285 color sensor. This sensor employs a color mosaic pattern, and its individual color channels have responses as shown in FIG. 8, where the blue channel response is labeled 801, the green channel response is labeled 802, and the red channel response is labeled 803. Different pre-processing techniques can be used, to correct for the cross-talk between color channels in this RGB camera.

It is helpful to analyze the composition of signal energy in each of the signal images $S_{x,y,b}$, in order to understand the pre-processing technique. The camera views the sample (or the clear-slide reference) through either filter 101 or filter 102. Thus, the signal level in each color channel is produced by combination of the filter transmission and the sensor response in that channel. Mathematically, the system response is the product of the filter transmission at each wavelength and the camera response.

Figure 9A:
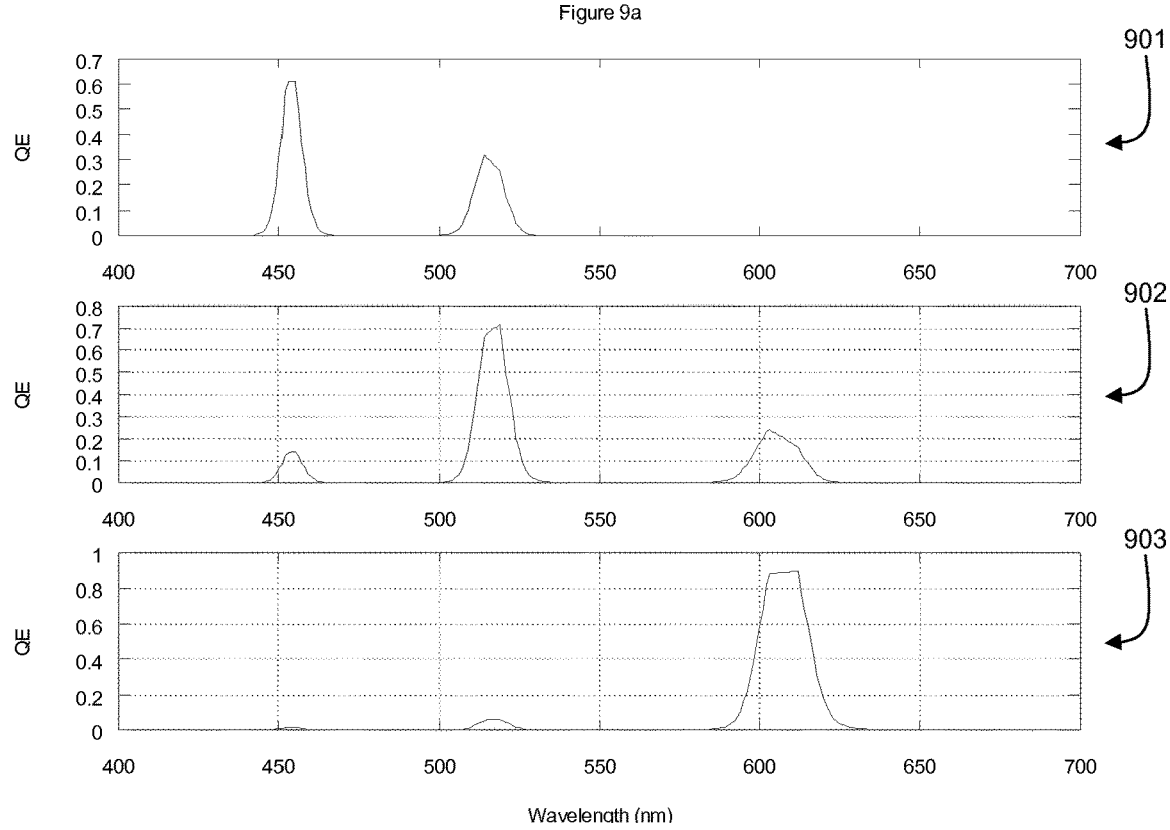
FIG. 9A is a graph showing the combined spectral response of the first filter in FIG. 1 and the Sony Bayer-pattern RGB camera of FIG. 8.
Figure 9B:
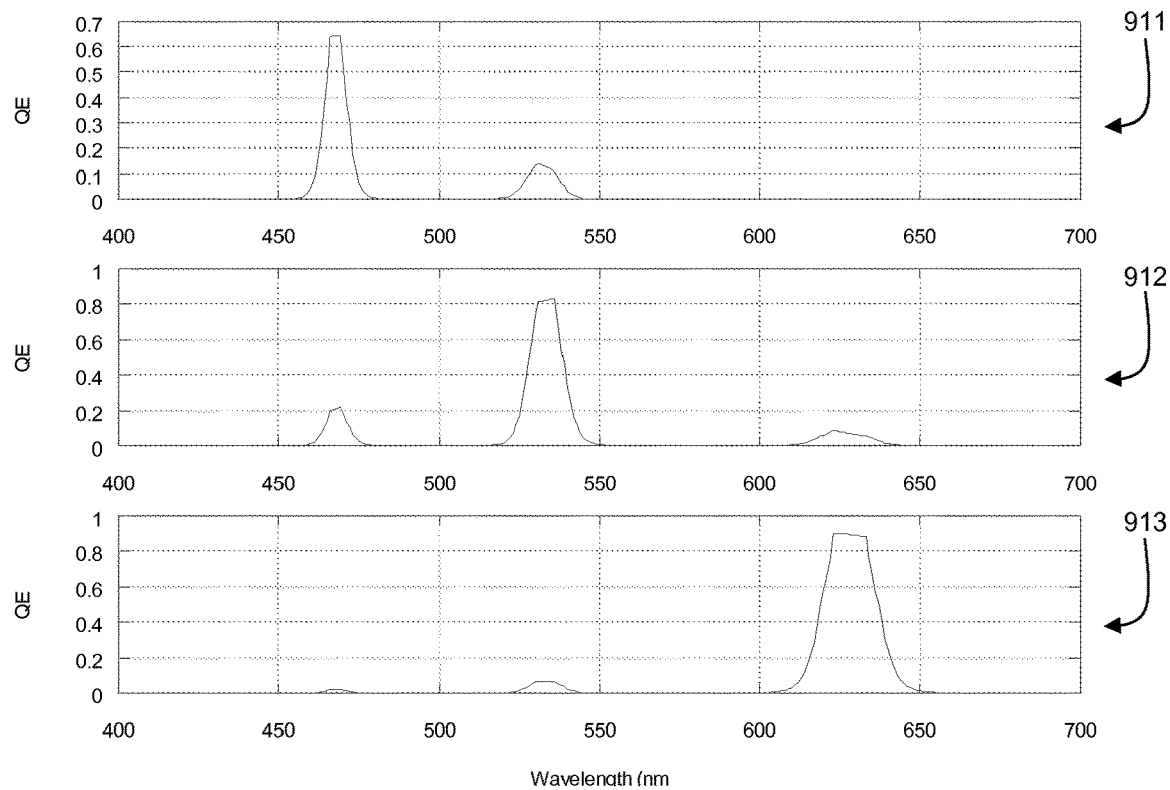
FIG. 9B is a graph showing the combined spectral response of the second filter in FIG. 1 and the Sony Bayer-pattern RGB camera of FIG. 8.

The overall response of the blue channel is shown in FIG. 9A with responsivity 901 for filter 101, and in FIG. 9B with responsivity 911 for filter 102. The green channel is shown in FIG. 9A with responsivity 902 for filter 101, and in FIG. 9B with responsivity 912 for filter 102. The red channel is shown in FIG. 9A with responsivity 903 for filter 101, and in FIG. 9B with responsivity 913 for filter 102. The responsivity curves show considerable cross-talk between the channels. Thus if a sample absorbed all red light, there would still be considerable signal in $S_{x,y,b}$ for the band b associated with the red channel when either filter 101 or 102 is used.

It would be valuable in a quantitative imaging system to be able to accurately assign energy to the wavelength range involved, so as to obtain accurate measurements of transmission and optical absorption. This can be achieved by determining and correcting for the actual cross-talk between channels. In order to do so, one needs an estimate of the coupling matrix CT between transmission band u and signal channel v when a given filter such as filter 101 or filter 102 is present.

The cross-talk can be tabulated by placing filter 102 in the light beam along with a selection filter that only transmits light in spectral band 104*a*, recording the signal strength in $S_{x,y,b}$, and then repeating with a different selection filter that transmits light only in spectral band 104*b*, and again with a selection filter that transmits light only in spectral band 104*c*. Typically, this procedure is performed with a clear slide as a sample, using the same exposure, gain, and other settings, as are employed in measurement of samples and white references.

For this example, the cross-talk values were tabulated by creating a 3×3 matrix, with the signals arising from filter 104*a* in the first column, those from filter 104*b* in the second column, and those from filter 104*c* in the third column. The rows correspond to the integrated signal levels in the blue, green, and red sensors, respectively:

$$CT_{104} = \begin{pmatrix} 5.140 & 3.552 & 0.0001 \\ 1.173 & 8.521 & 3.965 \\ 0.157 & 0.717 & 17.066 \end{pmatrix} \quad [2]$$

The same process was then performed for filter 102, where one spectral band at a time was selected. The equivalent cross-talk matrix for the filter with response shown by 105*a*, 105*b*, and 105*c* was:

$$CT_{105} = \begin{pmatrix} 5.631 & 3.552 & 0.0001 \\ 1.843 & 10613 & 1.516 \\ 1.856 & 0.867 & 17.958 \end{pmatrix} \quad [3]$$

The CT matrix for each filter can then be inverted to solve for what the measured signals would be if the camera had perfect channel isolation:

$$S_{corr\ x,y,b} = CT^{-1} S_{x,y,b} \quad [4]$$

Equation (4) represents a linear transformation of the signals, using linear algebraic notation, and it is superficially similar to the transformation that is applied when converting the sensor signals $S_{x,y,b}$ into R, G, and B color values in conventional RGB imaging. However, it differs in at least two important respects. First, the result $S_{corr}$ in this case is not an image of a scene, mapped to a chosen color space. Instead, it is the signal strength in each of three narrow bands defined by filter with response 101 or 102, as the light arrived at the camera. The cross-talk that arises within the camera itself has been markedly reduced or removed entirely.

Second, if the bands 104*a*, 104*b*, and 104*c* are relatively narrow, with a FWHM of 40 nm or less, or even 20 nm or less, each band is nearly monochromatic. This is in contrast to the spectral bands used in conventional RGB imaging, and has certain advantages. First, because the spectral bands are narrow, and the absorption spectra A(λ) of most biological stains used in bright-field work do not vary rapidly with wavelength, the measured signal is approximately uniform across any one spectral band. Also, as seen in FIGS. 9A and 9B, the variation in detector response within any given band 104*a-c* or 105*a-c* is small compared with the variations that occur over the full breadth of a given color channel, shown in FIG. 8. Taken together, these mean that the correction applied by Equation (4) is generally valid, and the cross-talk correction is effectively sample-independent. The use of Equation (4) with narrow spectral bands enables an assessment $S_{corr}$ of the signal strengths in the bands 104*a*-104*c*, and 105*a*-105*c*, that is much more accurate than the raw signals S. This, in turn, enables more accurate calculation of absorption, and more accurate spectral unmixing.

While techniques described above for cross-talk reduction are presented as part of a larger discussion involving how multiple images (or scans) may be combined to produce multispectral images of a sample, obtaining relatively narrowband images together with the use of a cross-talk correction matrix to produce improved estimates of signal strengths in bright-field imaging is useful for other applications as well. These techniques are used alone herein to achieve improved quantitative results, or are used in combination with other steps such as optical density calculation, spectral unmixing, and image analysis.

Although the prior example did not include use of a cross-talk correction matrix, it is possible to do so, and to use $S_{corr}$ in place of S in Equation (1). The decision to do so or not can be made based on factors such as the desired accuracy for a given task, the performance of the camera, the transmission of the filters, the properties of the samples being analyzed, and the feasibility of making additional measurements and performing the computation steps involved.

In general, it is desirable to use a camera with little cross-talk, meaning the off-diagonal terms in the cross-talk matrix are small compared to the diagonal terms. However, the use of Equation (4) improves the accuracy, especially when the filter response 101 or 102 produces relatively narrow spectral passbands for the individual peaks 104a-104c and 105a-105c.

Figure 2:
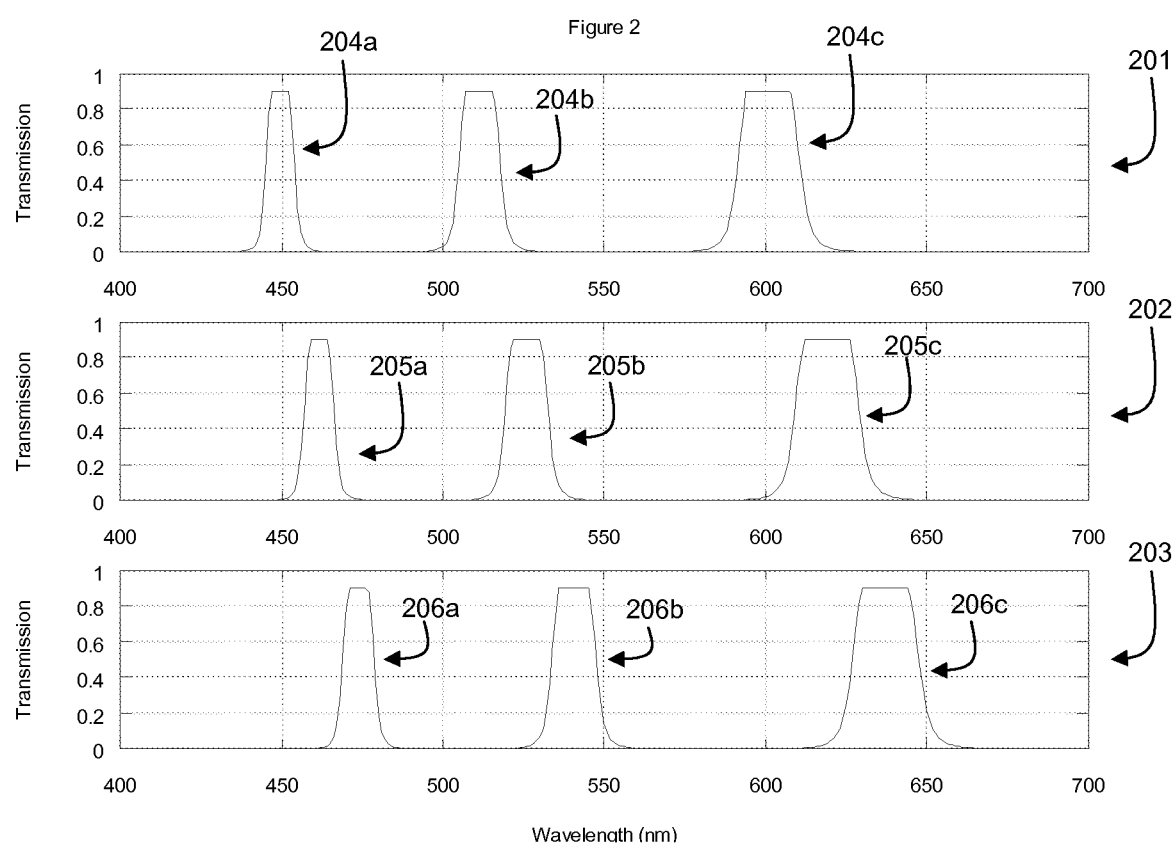
FIG. 2 is a graph showing light transmission as a function of wavelength for three spectral filters used to image samples.

In some embodiments, 3 filters are used. For example, filters with transmission responses 201 (with principal spectral bands 204a, 204b, and 204c), 202 (with principal spectral bands 205a, 205b, and 205c), and 203 (with principal spectral bands 206a, 206b, and 206c) in FIG. 2 can be used. In this example, a total of 3 sample images were taken, and the images were combined to form a spectral cube corresponding to 9 spectral bands. The cross-talk correction, if performed, uses 3 cross-talk matrices describing the cross-talk of bands 205a-205c across the camera's color channels.

In some embodiments, the filters are interchanged manually. In certain embodiments, filters can be changed using a mechanism such as a filter wheel. This can be located in the imaging path between the camera and the sample. For example, if the microscope has fluorescence optics with motorized selection of epi-filters, the filters can be placed in the epi-filter mechanism, in the place normally used by the emission (barrier) filter. No dichroic or excitation filter need be present.

When the filters are located in the imaging path, it is beneficial to use so-called "zero-shift" filters, for which the optical filter introduces very little wedge or image shift, ensuring good registration between the images taken with one filter in place, and those taken with another. Alternatively, or in addition, the images can be registered with one another by means of a shared band, as is described herein.

In some embodiments, the filters can be located in the illumination path, between the light source and the sample. This has the benefit that any image shift introduced by replacing filters does not cause images to be mis-registered to one another. Also, in many microscopes there are more options for mechanical and optical integration in the illumination path than in the imaging path. For example, the filters can reside in the lamp housing, or at either end of the fiber optic light guide (if one exists), or near the condenser lens.

In certain embodiments, multiple sets of LEDs can be used to produce illumination light with the desired spectral properties, rather than using various filters in the optical path. For example, each set of LEDs can produce light in three distinct, narrow bands, analogous to the bands shown in FIG. 1 or 2. In such an arrangement, the sample is first imaged with one set of LEDs, having a blue, green, and red band, and then imaged with a second set of LEDs having a blue, green, and red band. Further images with additional sets of LEDs is possible. Optionally, the cross-talk is corrected, and then the signals are combined to form an image cube having 4 or more, and more typically 6 or more, bands.

An important advantage of the methods and systems disclosed herein is that the associated time efficiency and simultaneous acquisition of multiple spectral bands enables use of a high-speed digital slide scanner to produce multispectral image cubes. Using the techniques described herein with a slide scanner instead of a microscope, one may scan the entire surface of a slide with a first filter 101 in the optical path, and then scan it with a second filter 102 in the optical path, to obtain multispectral images of a biological sample such as a tissue section, blood-related sample, or cytology smear, in a total of 6 relatively narrow spectral bands.

While the blue, green, and red bands within each scan will be well-aligned with one another, the two scans will usually be misaligned from one another, because the scan apparatus is usually not capable of perfect repeatability. If the scans were combined directly, the contents of a given pixel in the resulting image stack would not correspond to the same physical location in the sample, leading to blurring, loss of detail about fine structures, and loss of accuracy if the image is subjected to analysis such as spectral unmixing.

To address this misalignment, the systems and methods disclosed herein permit registration of the images of the two scans to one another based on images in each scan that correspond to a shared spectral band, in which the same structures will be present in both such images. By using a shared band, one can bring the two images into best registration. The same shift or image transformation that yields the best alignment between the two shared band images, e.g., in the green channel, is then applied to all channels, after which images in the two scans can be combined into an image stack. The resulting image stack will be free of misalignment, so fine image detail is preserved, and spectral analysis may be performed without loss of accuracy.

The choice of which spectral band to use as the shared band depends on the sample and how it was prepared. For many brightfield samples, hematoxylin is used as a counterstain. Because it absorbs across the range 500-650 nm, hematoxylin exhibits contrast in both the green and red bands. Thus, bands associated with the green channel, such as 104b and 105b, or the red channel, such as 104c and 105c, can be used as the shared band. When eosin is present, the green bands such as 104b and 105b may be preferred since that stain has high contrast in the green. More generally, the shared band is chosen such that the same structures are present in both images corresponding to the shared band, so that good image registration is attained.

One approach to performing image registration is to take the shared band image from the first scan as the reference, and find the best transformation of the shared band image from the second scan to it, and then assemble the image stack using the images from the second scan after they have been transformed. Another approach involves using the shared band image of the second scan as the reference instead, and transforming the images of the first scan. The transformation can be performed after all scanning has been completed, or can be performed while the scan(s) are underway.

In some embodiments, the transformation is a Cartesian translation, which corrects for shifts in position between the first scan and the subsequent scan(s). In certain embodiments, the transformation can also correct for rotation, which is valuable if the relative orientation of the sample and detector can vary between scans. More generally, one can use any transformation, including translation, rotation, magnification, and image warping to correct for the instrumental variation between scans. The decision about what transformations to use can be made based upon the sample and imaging system.

In certain embodiments, shifting to correct for offsets in the X and Y location is sufficient. In this case, one way to assess the best offset is to perform a cross-correlation between the shared band images in the different scans that were acquired, and compare the degree of correlation as a function of X and Y offset. If we denote the shared band images as $SB_1$ and $SB_2$, the cross-correlation XC can be calculated as:

$$XC(\delta x, \delta y) = \Sigma_{i=0}^{w} \Sigma_{j=0}^{h} SB_1(i,j) SB_2(i+\delta x, j+\delta y) \quad [5]$$

where i and j are x and y indices, and the shared band images are of dimensions w pixels by h pixels. The offset (dx, dy) corresponding to maximum cross-correlation is used, and the transformation involves translating image $SB_2$ by $(dx, dy)$.

In some embodiments, the correlation is evaluated only over a range of δx and δy that is large enough to correct for the anticipated image shift between the successive scans. This can reduce the calculation burden required to identify (dx, dy), and it prevents choosing distant, false maxima in the cross-correlation.

Figure 4:
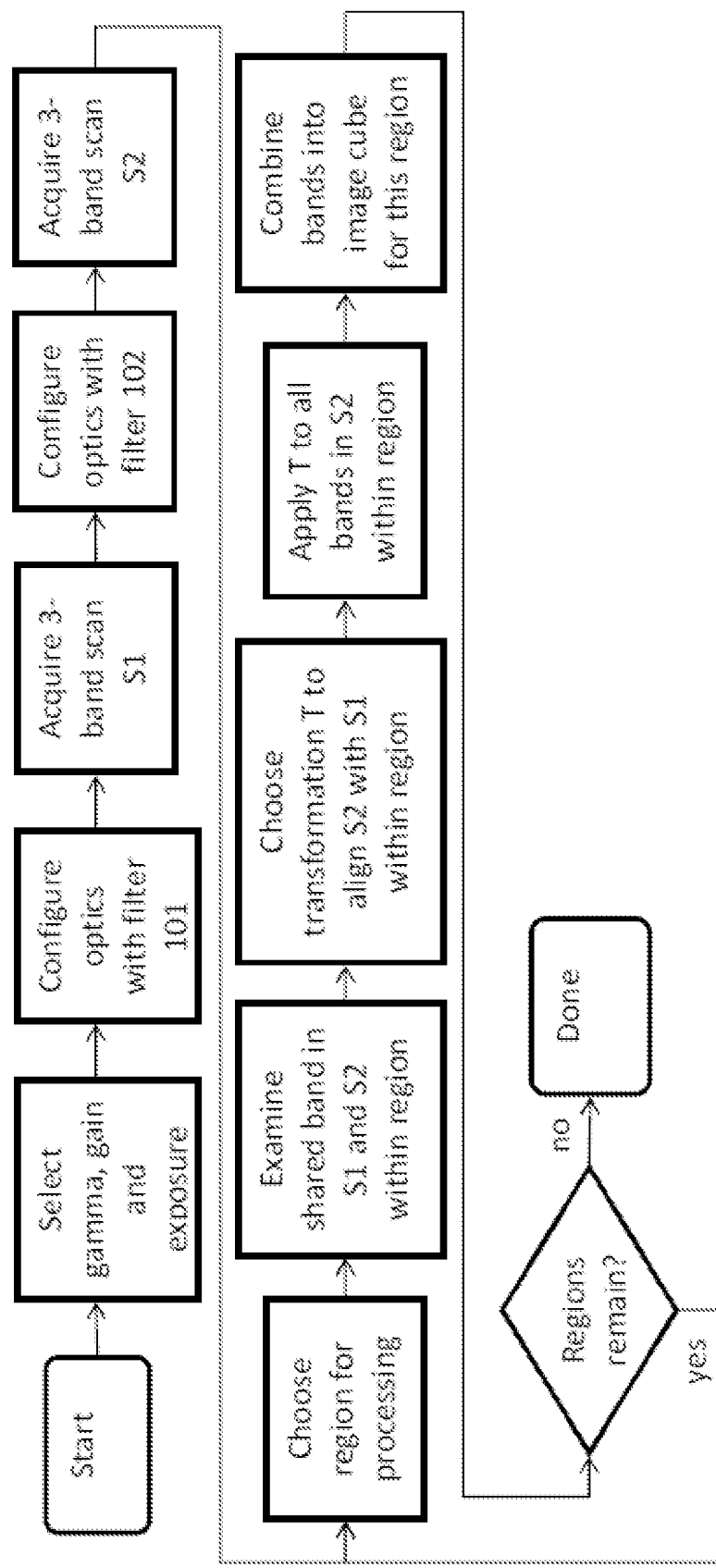
FIG. 4 is a flow chart that includes a series of steps for acquiring two scans of a biological sample and combining images from the scans to form a multispectral image stack.

One can find the best transformation for every single image that was acquired, and each image may be transformed by its particular transformation. Alternatively, the transformation may be found only once, for one image in the scan, and the entire scan is then transformed using the same transformation. As a further alternative, the transformation may be found at several locations in the image, such as for all fields in a grid, and individual images may be transformed using transformations based on their location, the locations for which best transformations were determined, and those transformations. The choice of which approach to use can be made based on the properties of the scanner, and whether a given transformation is valid over the whole scan, a region, or only one image. The foregoing steps are shown schematically in the flow chart of FIG. 4.

When adjacent images are shifted by different amounts, there can be overlaps or voids, between adjacent images after the transformation is applied. Thus there may be two values, or no values, available to assign to some locations in the transformed image. Where two values are available, one value may be ignored, or the average may be used. Where no values are available (e.g., for voids), in some embodiments the camera acquires images over a slightly larger region than is normally used in order to provide a small perimeter region for stitching of adjacent images. If the extra pixels in the perimeter region are available at the time that the transformation is done, these pixels can be used to supply the proper value in the voids. Alternatively, interpolation may be used, as the gaps are generally small. As a further alternative, voids can be flagged as invalid for downstream processing steps.

Once the transmission T has been obtained from the signal S and the White reference (and optionally, the Dark reference) reference(s), the optical density (OD) can be calculated as:

$$OD_{x,y,b} = \log_{10}(T_{x,y,b}) \quad [6a]$$

or $$OD_{x,y,b} = \ln(T_{x,y,b}) \quad [6b]$$

While OD is conventionally calculated using $\log_{10}$, it is also possible to use natural logarithms as shown in Equation (6b) instead, as the choice of base simply scales the result by a constant.

The image, or image stack, can then be spectrally unmixed to produce component images, each corresponding to contributions from substantially only one of the various stains and chromogens that are present in the sample. Software for performing spectral unmixing includes the Nuance and inForm packages, available from PerkinElmer (Waltham, Mass.), and the ENVI package, available from Exelis (Boulder, Colo.). Other aspects, features, methods, and systems for performing spectral unmixing are disclosed, for example in U.S. Pat. No. 8,280,140, the entire contents of which are incorporated herein by reference.

In the examples described above, three additional serial tissue sections were prepared for purposes of spectral library development, which had (respectively) only hematoxylin, only DAB, and only Liquid Permanent Red applied. Representative regions that exemplified each stain were imaged using the methods described herein, and the spectrum for each stain was extracted from pixels of the OD-converted image cubes. These spectra formed the spectral library, or end-members, for the spectral unmixing into component images.

The result of spectral unmixing is a set of component images, each of which indicates the location and amount of one of the various stains (e.g., the components) present in the sample. The component images are a rich dataset for various kinds of image analysis, including expression measurements, co-localization, positivity analysis, and assessment of biomarker indices (cancer prognostics, patient stratification, etc.) that involve these quantities, or any quantitative measurement of stained tissue.

Figure 5:
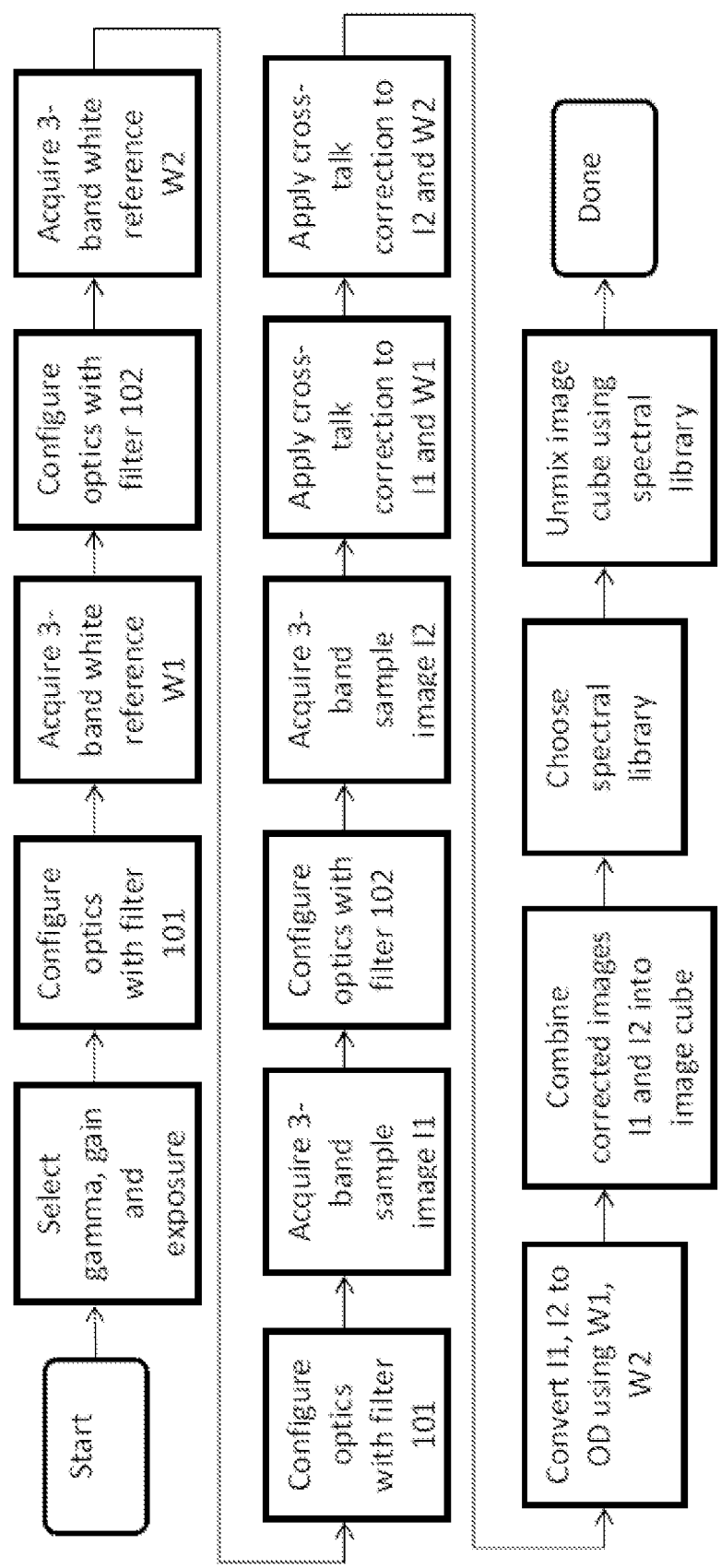
FIG. 5 is a flow chart that includes a series of steps for obtaining a multispectral image stack for a sample and unmixing the image stack.
Figure 6:
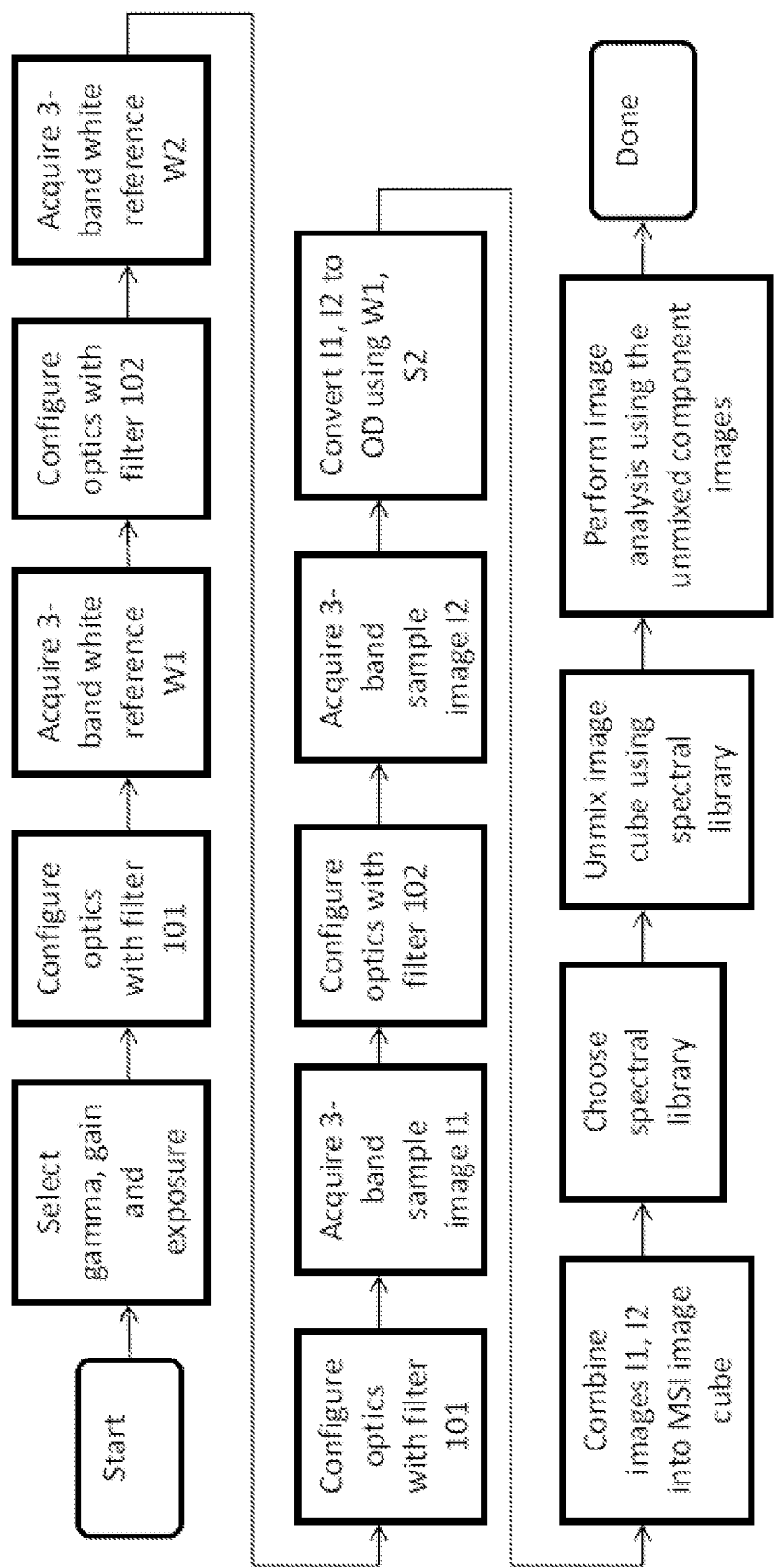
FIG. 6 is a flow chart that includes a series of steps for obtaining and unmixing a multispectral image stack into component images, and analyzing the component images.

The component images are suitable for image analysis and object classification using a variety of methods. Systems and methods for performing image analysis and classification are the techniques described, for example, in U.S. Pat. Nos. 7,155,555 and 8,280,140, the entire contents of each of which is incorporated herein by reference. As a result, the methods disclosed herein can include acquiring images and processing them as described above, image pre-processing and unmixing into component images, object classification to find tissue structures, cells, or sub-cellular compartments, and measurement of protein expression by assessing signal levels in the unmixed components. The foregoing steps are shown schematically in the flow charts of FIGS. 5 and 6.

The improved accuracy provided by the systems and methods disclosed herein results in more accurate measurements of individual stains. It also means that spatially co-localized stains can be detected or measured more reliably. For example, brown and red stains can be used in combination, even when they are expressed in overlapping or identical biological structures. Also, because the systems and methods can generate bright-field multispectral image cubes with 4 or more bands, or 5 or more bands, or 6 or more bands, it is possible to spectrally unmix a sample into N species, where N>3. Accordingly, the systems and methods disclosed herein provide for increased accuracy in quantifying samples that have been prepared with a single IHC species, for more reliable and accurate measurements of samples that have been prepared with two IHC species, and for measurement of N>3 species, such as three IHC species and a counterstain. Measurements that involve co-localization of one or more IHC species with one another, or with a counterstain, are especially amenable to the methods and systems disclosed herein.

The image stacks or image cubes generated typically include signals at several relatively narrow bands. However, a high-fidelity color image is often desirable along with, or instead of, the quantitative results described above. Color images can be produced from the narrow-band signal values as follows.

The overall color rendering process calculates the appearance of the sample when illuminated by a certain light source, which need not be the actual light source present in the microscope. It is often desirable to simulate the appearance of a sample in a microscope with a daylight-matched lamp (D65), though the lamp in the microscope or scanner may actually have another (possibly unknown) color temperature. First, one tabulates certain colorimetric values, namely the colorimetric response of the monitor, MON; the gun strength of the color primaries GS; the spectral response ILL of the desired light source; and SO, the colorimetric model of the viewer's response. For example, one may use the CIE 1931 standard observer as SO; the CIE D65 illuminant as ILL; the chromaticity of the NTSC primaries as MON; and a GS matrix chosen to yield a D65 white point at the monitor when all primaries have equal strength. The spectral tables all use 10 nm resolution, columns are ordered as B, G, R, and rows of chromaticity are ordered as z, y, x.

$$SO = \begin{pmatrix} 0.0679 & 0.0004 & 0.0143 \\ 0.2074 & 0.0012 & 0.0435 \\ 0.6456 & 0.0040 & 0.1344 \\ 1.3856 & 0.0116 & 0.2839 \\ 1.7471 & 0.0230 & 0.3483 \\ 1.7721 & 0.0380 & 0.3362 \\ 1.6691 & 0.0600 & 0.2908 \\ 1.2876 & 0.0910 & 0.1954 \\ 0.8130 & 0.1390 & 0.0956 \\ 0.4652 & 0.2080 & 0.0320 \\ 0.2720 & 0.3230 & 0.0049 \\ 0.1582 & 0.5030 & 0.0093 \\ 0.0782 & 0.7100 & 0.0633 \\ 0.0422 & 0.8620 & 0.1655 \\ 0.0203 & 0.9540 & 0.2904 \\ 0.0087 & 0.9950 & 0.4334 \\ 0.0039 & 0.9950 & 0.5945 \\ 0.0021 & 0.9520 & 0.7621 \\ 0.0017 & 0.8700 & 0.9163 \\ 0.0011 & 0.7570 & 1.0263 \\ 0.0008 & 0.6310 & 1.0622 \\ 0.0003 & 0.5030 & 1.0026 \\ 0.0002 & 0.3810 & 0.8544 \\ 0.0000 & 0.2650 & 0.6424 \\ 0.0000 & 0.1750 & 0.4479 \\ 0.0000 & 0.1070 & 0.2835 \\ 0.0000 & 0.0610 & 0.1649 \\ 0.0000 & 0.0320 & 0.0874 \\ 0.0000 & 0.170 & 0.0468 \\ 0.0000 & 0.0082 & 0.0227 \\ 0.0000 & 0.0041 & 0.0114 \end{pmatrix}^T \quad [7a]$$

$$ILL = \begin{pmatrix} 82.7549 \\ 91.4860 \\ 93.4318 \\ 86.6823 \\ 104.8650 \\ 117.0080 \\ 117.8120 \\ 114.8612 \\ 115.9230 \\ 108.8110 \\ 109.3540 \\ 107.8020 \\ 104.7900 \\ 107.6890 \\ 104.4050 \\ 104.0460 \\ 100.0000 \\ 96.3342 \\ 95.7880 \\ 88.6856 \\ 90.0062 \\ 89.5591 \\ 87.6987 \\ 83.2886 \\ 83.6992 \\ 80.0268 \\ 80.2146 \\ 82.2778 \\ 78.2842 \\ 69.7213 \\ 71.6091 \end{pmatrix}^T \quad [7b]$$

$$MON = \begin{pmatrix} 0.7800 & 0.1050 & 0.0350 \\ 0.0650 & 0.5950 & 0.3350 \\ 0.1550 & 0.3000 & 0.6300 \end{pmatrix} \quad [7c]$$

$$GS = \begin{pmatrix} 0.396892 & 0 & 0 \\ 0 & 0.390340 & 0 \\ 0 & 0 & 0.212766 \end{pmatrix} \quad [7d]$$

As a cross-check, one can confirm that the monitor output for equal-strength signals in each of the channels (B, G, R) matches CILL, the expected chromaticity of the illuminant:

$$CILL = SO * ILL^T \quad [8]$$

$$= MON * GS * \begin{pmatrix} 1 \\ 1 \\ 1 \end{pmatrix}$$

$$= \begin{pmatrix} 0.309578 & 0.040986 & 0.007447 \\ 0.025798 & 0.232252 & 0.072377 \\ 0.061518 & 0.117102 & 0.134043 \end{pmatrix} * \begin{pmatrix} 1 \\ 1 \\ 1 \end{pmatrix}$$

$$= \begin{pmatrix} 0.35801 \\ 0.32933 \\ 0.31266 \end{pmatrix}$$

From these, one calculates various derived quantities. QFAWILL, the matrix relating the pre-gamma contribution to RGB at the monitor, associated with each wavelength, is calculated as:

$$QFAWILL = (MON*GS)^{-1} * SO * \mathrm{diag}(ILL) \quad [9]$$

where diag(A) indicates a square matrix with values of A along the diagonal, and zeros elsewhere.

From this, one constructs QFAWILLACT that retains only those columns that are nearest to the center wavelengths of bands present in the image cube.

Next, one calculates the white point WPACT as the row-wise sums of QFAWILLACT:

$$WPACT = QFAWILLACT * \begin{pmatrix} 1 \\ \vdots \\ 1 \end{pmatrix} \quad [10]$$

and scales QFAWILL by the ratio of the desired white point to WPACT, to obtain WEIGHTS:

$$WEIGHTS = QFAWILLACT * \text{diag}(CILL) * (\text{diag}(WPACT))^{-1} \quad [11]$$

Finally, one may calculate the color image values at a given pixel in the image cube T as:

$$BGR = (WEIGHTS * T_{xy})^{1/\gamma} \quad [12]$$

where $T_{xy}$ is the set of signal values in transmission space expressed as a column vector, $\gamma$ is the gamma value used for image rendering (such as 1.8); and BGR are the blue, green, and red values associated with that pixel in the rendered image.

This technique has the benefit that a high-quality color image is obtained, there is no need to acquire an additional RGB image (or scan), and color rendering is predictable and traceable to colorimetric space without relying on details of the camera's responsivity or of the lamp color temperature. Thus it is repeatable, provided the WHITE reference is valid, and the wavelengths of the bands are correct. The technique only samples that portion of the overall spectrum that falls within one of the bands such as 104a-c or 105a-c. Thus, it is as if one views the sample through an illuminant that is only present in these bands, and the color-rendering index is reduced as a result. For most bright-field samples and stains, however, the overall image quality is nonetheless high.

Figure 10:
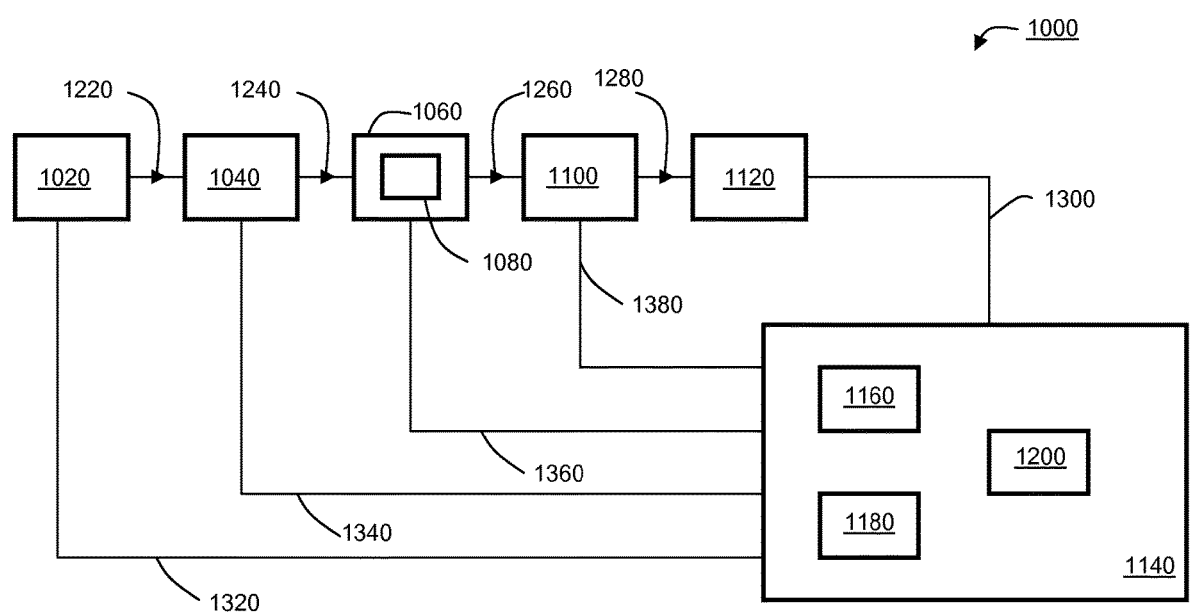
FIG. 10 is a schematic diagram of a system for acquiring spectral images of a sample.

FIG. 10 is a schematic diagram showing a system 1000 for acquiring multiple spectrally resolved images of a sample. A light source 1020 provides light 1220 to light conditioning optics 1040. Light 1220 can be incoherent light, such as light generated from a filament source for example, or light 1220 can be coherent light, such as light generated by a laser. Light 1220 can be either continuous-wave (CW) or time-gated (i.e., pulsed) light. Further, light 1220 can be provided in a selected portion of the electromagnetic spectrum. For example, light 1220 can have a central wavelength and/or a distribution of wavelengths that falls within the ultraviolet, visible, infrared, or other regions of the spectrum.

Light conditioning optics 1040 can be configured to transform light 1220 in a number of ways. For example, light conditioning optics 1040 can spectrally filter light 1220 (e.g., using epi-filters) to provide output light in a selected wavelength region of the spectrum. Alternatively, or in addition, light conditioning optics can adjust the spatial distribution of light 1220 and the temporal properties of light 1220. Incident light 1240 is generated from light 1220 by the action of the elements of light conditioning optics 1040.

Incident light 1240 is directed to be incident on sample 1080 mounted on illumination stage 1060. Stage 1060 can provide means to secure sample 1080, such as mounting clips or other fastening devices. Alternatively, stage 1060 can include a movable track or belt on which a plurality of samples 1080 are affixed. A driver mechanism can be configured to move the track in order to successively translate the plurality of samples, one at a time, through an illumination region on stage 1060, whereon incident light 1240 impinges. Stage 1060 can further include translation axes and mechanisms for translating sample 1080 relative to a fixed position of illumination stage 1060. The translation mechanisms can be manually operated (e.g., threaded rods) or can be automatically movable via electrical actuation (e.g., motorized drivers, piezoelectric actuators).

In response to incident light 1240, emitted light 1260 emerges from sample 1080. Typically, incident light 1240 can be absorbed by sample 1080, and emitted light 1260 corresponds to the portion of incident light 1240 that is transmitted through sample 1080 (e.g., the portion of incident light 1240 that is not absorbed by sample 1080).

In many embodiments, sample 1080 is a biological sample such as a tissue slice (e.g., a sample used for pathology, or a cell suspension or smear, as in cytology studies), or living or fixed cells in tissue culture. Sample 1080 is typically positioned on a slide, which is held in position by stage 1060.

Light collecting optics 1100 are positioned to received emitted light 1260 from sample 1080. Light collecting optics 1100 can be configured to collimate emitted light 1260 when light 1260 is divergent, for example. Light collecting optics 1100 can also be configured to spectrally filter emitted light 1260. Filtering operations can be useful, for example, in order to isolate a portion of emitted light 1260 arising via one of the mechanisms discussed above from light arising via other processes. Light collecting optics 1100 transform emitted light 1260 into output light 1280 which is incident on detector 1120.

Detector 1120 includes one or more elements such as CCD and/or CMOS sensors configured to detect output light 1280. Detector 1120 generates an electrical signal that corresponds to output light 1280, and is communicated via electrical communication line 1300 to electronic control system 1140.

Electronic control system 1140 includes a processor 1160, a display device 1180, and a user interface 1200. In addition to receiving signals corresponding to output light 1280 detected by detector 1120, control system 1140 sends electrical signals to detector 1120 to adjust various properties of detector 1120. For example, if detector 1120 includes a CCD sensor, control system 1140 can send electrical signals to detector 1120 to control the exposure time, active area, gain settings, and other properties of the CCD sensor.

Electronic control system 1140 also communicates with light source 1020, light conditioning optics 1040, illumination stage 1060, and light collecting optics 1100 via electrical communication lines 1320, 1340, 1360, and 1380, respectively. Control system 1140 provides electrical signals to each of these elements of system 1000 to adjust various properties of the elements. For example, electrical signals provided to light source 1020 can be used to adjust the intensity, wavelength, repetition rate, or other properties of light 1220. Signals provided to light conditioning optics 1040 and light collecting optics 1100 can include signals for configuring properties of devices that adjust the spatial properties of light (e.g., spatial light modulators) and for configuring spectral filtering devices, for example. Signals provided to illumination stage 1060 can provide for positioning of sample 1080 relative to stage 1060 and/or for moving samples into position for illumination on stage 1060, for example.

Control system 1140 includes a user interface 1200 for displaying system properties and parameters, and for displaying captured images of sample 1080. User interface 1200 is provided in order to facilitate operator interaction with, and control over, system 1000. Processor 1160 includes a storage device for storing image data captured using detector 1120, and also includes computer software that embodies instructions to processor 1160 that cause processor 1160 to carry out control functions, such as those discussed above for example. Further, the software instructions cause processor 1160 to mathematically manipulate the images captured by detector 1120 and to carry out the steps of analyzing sample images, unmixing sample images, and classifying the unmixed images.

In many embodiments, system 1000 is configured to acquire multiple spectral images of sample 1080. Spectral filtering elements in light conditioning optics 1040 and/or light collecting optics 1100 are generally used to obtain the spectrally resolved data.

In some embodiments, light conditioning optics 1040 include an adjustable spectral filter element such as a filter wheel. In general, both light conditioning optics 1040 and light collecting optics 1100 include configurable spectral filter elements. Therefore, spectral resolution can be provided either on the illumination side of sample 1080 (e.g., via light conditioning optics 1040), on the imaging side of sample 1080 (e.g., via light collecting optics 110), or both.

Hardware and Software

The steps described above in connection with various methods for collecting, processing, analyzing, interpreting, and displaying information from samples can be implemented in computer programs using standard programming techniques. Such programs are designed to execute on programmable computers or specifically designed integrated circuits, each comprising an electronic processor (e.g., processor 1160), a data storage system (including memory and/or storage elements), at least one input device, and least one output device, such as a display or printer. The program code is applied to input data (e.g., images from the detector) to perform the functions described herein and generate output information (e.g., images showing classified regions of samples, statistical information about sample components, etc.), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis and control functions described herein. Electronic processor 1160 can, in general, be configured through software instructions to perform any of the method steps, analysis functions, control functions, and image processing steps disclosed herein.

Other Embodiments

While examples have been provided for purposes of explanation, combinations, substitutions and alterations can be made to suit the goals, apparatus, and samples at hand, without deviating from the spirit of the disclosure. It is intended that the scope of the disclosure be limited only by the claims appended hereto.

What is claimed is:

1. A method, comprising:
   obtaining a first image of a sample, wherein the first image corresponds to first incident light transmitted through the sample in a first plurality of distinct spectral bands;
   subsequent to obtaining the first image, obtaining a second image of the sample, wherein the second image corresponds to second incident light generated after the first incident light and transmitted through the sample in a second plurality of distinct spectral bands, and wherein at least some members of the second plurality of spectral bands are different from the members of the first plurality of spectral bands; and
   using an electronic processor to combine the first and second images to form a multispectral image stack, wherein each pixel in the image stack comprises information corresponding to at least four distinct spectral bands, and wherein the at least four distinct spectral bands comprise at least one member from the first plurality of spectral bands and at least one member from the second plurality of spectral bands.

2. The method of claim 1, wherein each pixel in the image stack comprises information corresponding to at least five distinct spectral bands.

3. The method of claim 1, wherein each pixel in the image stack comprises information corresponding to at least six distinct spectral bands.

4. The method of claim 1, wherein the first plurality of distinct spectral bands comprises a spectral band in a green region of the electromagnetic spectrum having a full width at half maximum of 40 nm or less.

5. The method of claim 4, wherein the spectral band in the green region has a full width at half maximum of 30 nm or less.

6. The method of claim 2, further comprising using the electronic processor to unmix the image stack to obtain one or more component images, wherein each of the component images corresponds substantially only to contributions from one of the spectral contributors in the sample.

7. The method of claim 6, further comprising using the electronic processor to convert light intensity values corresponding to each of the pixels in the image stack to optical density units prior to unmixing the image stack.

8. The method of claim 6, further comprising using the electronic processor to analyze the sample based on the one or more component images to determine locations of features within the sample.

9. The method of claim 1, further comprising using a slide scanner to obtain the first and second images.

10. The method of claim 9, wherein the first plurality of spectral bands and the second plurality of spectral bands each comprise a shared spectral band, the method further comprising using the electronic processor to align the first and second images prior to forming the image stack based on information from the first and second images corresponding to the shared spectral band.

11. A system, comprising:
    a light source configured to illuminate a sample;
    a detector configured to obtain one or more images of the sample; and
    an electronic processor coupled to the detector and configured to:
    obtain a first image of a sample, wherein the first image corresponds to first incident light generated by the light source and transmitted through the sample in a first plurality of distinct spectral bands;

subsequent to obtaining the first image, obtain a second image of the sample, wherein the second image corresponds to second incident light generated by the light source after first incident light and transmitted through the sample in a second plurality of distinct spectral bands, and wherein at least some members of the second plurality of spectral bands are different from the members of the first plurality of spectral bands; and combine the first and second images to form a multispectral image stack, wherein each pixel in the image stack comprises information corresponding to at least four distinct spectral bands, and wherein the at least four distinct spectral bands comprise at least one member from the first plurality of spectral bands and at least one member from the second plurality of spectral bands.

12. The system of claim 11, wherein each pixel in the image stack comprises information corresponding to at least five distinct spectral bands.

13. The system of claim 11, wherein each pixel in the image stack comprises information corresponding to at least six distinct spectral bands.

14. The system of claim 11, wherein the first plurality of distinct spectral bands comprises a spectral band in a green region of the electromagnetic spectrum having a full width at half maximum of 40 nm or less.

15. The system of claim 14, wherein the spectral band in the green region has a full width at half maximum of 30 nm or less.

16. The system of claim 12, wherein the electronic processor is further configured to unmix the image stack to obtain one or more component images, wherein each of the component images corresponds substantially only to contributions from one of the spectral contributors in the sample.

17. The system of claim 16, wherein the electronic processor is further configured to convert light intensity values corresponding to each of the pixels in the image stack to optical density units prior to unmixing the image stack.

18. The system of claim 16, wherein the electronic processor is further configured to analyze the sample based on the one or more component images to determine locations of features within the sample.

19. The system of claim 11, further comprising a slide scanner that comprises the light source and the detector.

20. The system of claim 19, wherein the first plurality of spectral bands and the second plurality of spectral bands each comprise a shared spectral band, and the electronic processor is further configured to align the first and second images prior to forming the image stack based on information from the first and second images corresponding to the shared spectral band.

21. The method of claim 1, further comprising:
subsequent to obtaining the second image, obtaining a third image of the sample, wherein the third image corresponds to third incident light generated after the second incident light and transmitted through the sample in a third plurality of distinct spectral bands, and wherein at least some members of the third plurality of spectral bands are different from the members of the first and second pluralities of spectral bands; and
using the electronic processor to combine the third image with the first and second images to form the multispectral image stack, wherein the at least four distinct spectral bands comprise at least one member from the first plurality of spectral bands, at least one member from the second plurality of spectral bands, and at least one member from the third plurality of spectral bands.

* * * * *